US012670080B2

(12) United States Patent
Seth et al.

(10) Patent No.: US 12,670,080 B2
(45) Date of Patent: Jun. 30, 2026

(54) SYSTEM AND METHOD FOR OPTIMIZING PERFORMANCE OF A PROCESS

(71) Applicant: Incedo Inc., Iselin, NJ (US)

(72) Inventors: Nitin Seth, Florham Park, NJ (US); Vivek Kakade, Maharashtra (IN)

(73) Assignee: Incedo Inc., Iselin, NJ (US)

( * ) Notice: Subject to any disclaimer, the term of this patent is extended or adjusted under 35 U.S.C. 154(b) by 572 days.

(21) Appl. No.: 17/844,233

(22) Filed: Jun. 20, 2022

(65) Prior Publication Data

US 2023/0409460 A1 Dec. 21, 2023

(51) Int. Cl.
| *G06F 11/00* | (2006.01) |
| *G06F 11/07* | (2006.01) |
| *G06F 11/34* | (2006.01) |

(52) U.S. Cl.
CPC ........ *G06F 11/3409* (2013.01); *G06F 11/079* (2013.01)

(58) Field of Classification Search
CPC .. G06F 11/079; G06F 11/3409; G06F 11/302; G06F 11/3452; G06F 11/0793; G06N 20/00
See application file for complete search history.

(56) References Cited

U.S. PATENT DOCUMENTS

| 10,459,818 | B2 * | 10/2019 | Cirne | G06F 11/0751 |
| 10,552,390 | B2 * | 2/2020 | Anand | G06F 16/217 |
| 11,972,382 | B2 * | 4/2024 | Sun | G06N 5/022 |

| 2010/0332439 | A1 * | 12/2010 | Adachi | G06Q 30/02 |
| | | | | 706/52 |
| 2018/0276063 | A1 * | 9/2018 | Mendes | G06F 11/3409 |
| 2020/0241949 | A1 * | 7/2020 | Basu | G06F 11/0775 |
| 2020/0382361 | A1 * | 12/2020 | Chandrasekhar | G06N 5/01 |
| 2021/0026723 | A1 * | 1/2021 | Nadger | G06F 11/3409 |
| 2021/0035026 | A1 * | 2/2021 | Bansal | G06F 11/3006 |
| 2021/0089991 | A1 * | 3/2021 | Ishino | G06Q 10/063 |
| 2022/0038332 | A1 * | 2/2022 | Umakanth | H04L 41/5016 |
| 2022/0245557 | A1 * | 8/2022 | Minter | G06N 20/00 |
| 2023/0050889 | A1 * | 2/2023 | Kumar Jaya Kumar | |
| | | | | G06F 16/9027 |
| 2023/0105304 | A1 * | 4/2023 | Mandal | G06F 18/2415 |
| | | | | 714/37 |
| 2023/0229537 | A1 * | 7/2023 | Harutyunyan | G06F 11/079 |
| | | | | 714/26 |

(Continued)

*Primary Examiner* — Jonathan D Gibson

(74) *Attorney, Agent, or Firm* — Nath, Goldberg & Meyer; Joshua B. Goldberg

(57) ABSTRACT

The present invention relates to a system and method for optimizing performance of a process by constructing a KPI tree structure modelling workflow of the process using data received from a client device; autonomously monitoring a plurality of interconnected metrics by analysing data from the KPI tree structure; determining one or more root causes for an issue affecting the performance based on the autonomous monitoring of the plurality of interconnected metrics; recommending one or more actions correlating with one or more levels in the workflow to remediate the one or more root causes, supported by controlled experimentation as a sub-step; enabling performance of the one or more actions in the process workflow by integrating the one or more actions with execution of process workflow; and tracking impact of the one or more actions using continually received feedback on implemented actions and analysis of data from the KPI tree structure.

17 Claims, 5 Drawing Sheets

(56) References Cited

U.S. PATENT DOCUMENTS

2023/0353447 A1* 11/2023 Vaderna ............. H04L 41/0631
2023/0409460 A1* 12/2023 Kakade ................ G06F 11/079
2024/0020191 A1* 1/2024 Harutyunyan ...... G06F 11/3409

* cited by examiner

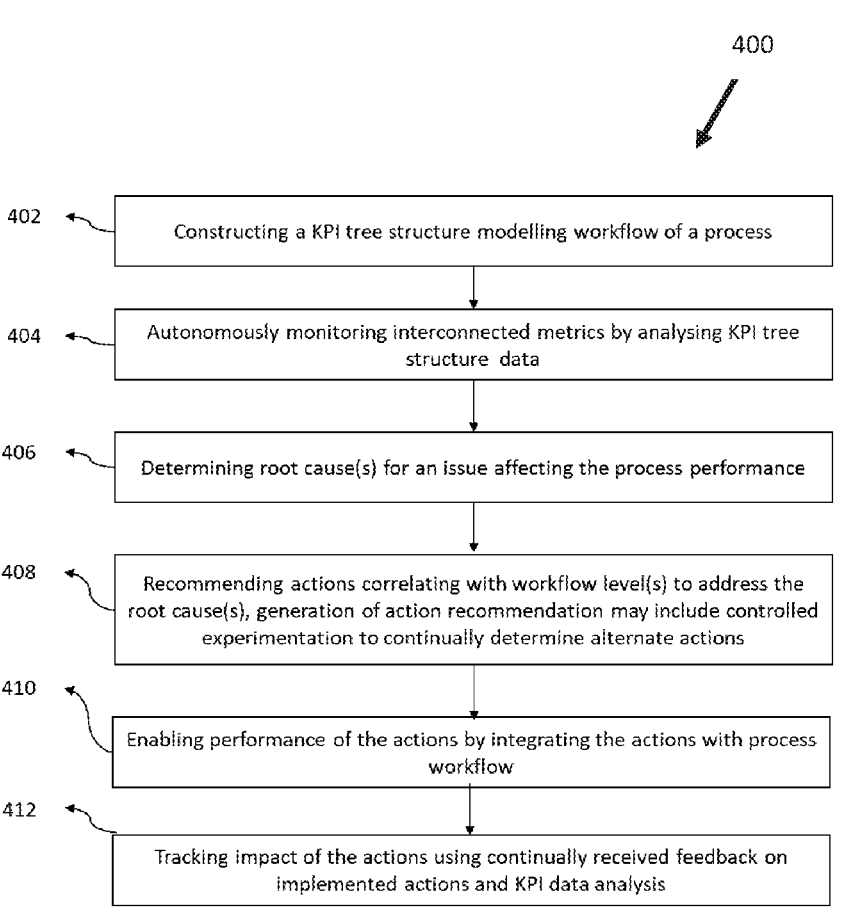

400

402 — Constructing a KPI tree structure modelling workflow of a process

404 — Autonomously monitoring interconnected metrics by analysing KPI tree structure data 406 — Determining root cause(s) for an issue affecting the process performance 408 — Recommending actions correlating with workflow level(s) to address the root cause(s), generation of action recommendation may include controlled experimentation to continually determine alternate actions 410 — Enabling performance of the actions by integrating the actions with process workflow 412 — Tracking impact of the actions using continually received feedback on implemented actions and KPI data analysis

Figure 4

SYSTEM AND METHOD FOR OPTIMIZING PERFORMANCE OF A PROCESS

FIELD

The present invention pertains to the field of Decision Automation. More specifically, however not exclusively, the present invention relates to a system and method for optimizing performance of a process leveraging artificial intelligence (AI) driven insight generation and action recommendation.

BACKGROUND

Decision automation refers to techniques that use data, rules, and increasingly AI to automate the decision making in operations that are core to various processes. The processes may relate to various organizations across areas including healthcare, finance, manufacturing etc. Decision automation augments human decision making by increasing productivity and responsiveness and reducing error.

In the last several years, Decision Automation has seen several technology solutions. The technology solutions (Decision Automation 1.0) have focused on the application of automation to routine, repetitive tasks (actions, decisions) by codifying well-defined rules such as Robotic Process Automation solutions e.g. UIPath, Automation Anywhere and workflow automation solutions e.g. Pega, Unqork.

With an increasing number of organizations automating processes across different functional areas, it is required to continually improve the processes including the process workflow so as to adapt to changing circumstances and user behavior. There is also a significant opportunity to utilize Machine learning (ML) to understand user behavior/response to a process in order to improve the process. However, in an increasingly Volatile, Uncertain, Complex and Ambiguous environment, it is not enough to rely on pre-defined rules to define processes. On the contrary, it is increasingly required to modify process workflow and make decisions in a dynamic environment in view of the uncertainty in user response to a specific process execution, making it difficult to define the rules a priori. Considerable performance issues may materialize if the process workflow is not updated with changing end-user behavior. Further, external factors have an increasingly significant impact on how process workflow need to be modified to respond to evolving situations. With fast changing scenarios, decisions are no longer limited to linear, cause-and-effect scenarios. Instead, decisions have to be made in an iterative manner in a 'test and learn' mindset. For example, in a banking related process, as fintechs continue to disintermediate the banking process, user banking teams switch to experimenting with product/service variants (e.g., bundles, pricing strategies). These problems result in an environment which make it difficult for an organization to find and troubleshoot issues that degrade the quality of service for end-users of the process. While key performance indicators on process may provide insight into the performance of the process, however, KPI on their own may not provide an end-to-end view of the performance of all elements involved in a process workflow. As a result, proper diagnosis of anomalies and/or troubleshooting may not be performed due to the lack of visibility to the underlying root cause. Thus, the existing solutions invariably suffer from various problems, making them insufficient, inflexible, computationally suboptimal, unreliable, or otherwise unsuitable for their purposes.

There is clearly an opportunity to provide Decision Automation Solutions that can leverage AI/ML technologies to augment the human decision-making process. It is required to develop intelligent Decision Automation solutions leveraging AI/ML that provide insights relating to reducing the uncertainty by identifying the right problem areas to focus on based on the underlying behavioral factors. It is further required to provide action recommendations that are tailored to specific cohorts as opposed to generic actions and even further to evaluate alternative actions in a controlled experimenting environment to continually determine the most effective actions. The evaluation of effective alternate actions/remedies is to be done without negatively impacting the service level of the process. Furthermore, said action determination is desired to be performed in a very fast and iterative manner to progressively improve the performance of the process in near real-time.

In view of the above shortcomings of the existing systems, novel and improved solutions which not only substantially overcome the problems of the prior art but also enable process optimization while leveraging AI driven insight generation and action recommendation to achieve improvement in process outcome are desired.

SUMMARY

The present invention encompasses optimizing a process through AI driven generation of insights about the performance of process.

Process optimization referred generally herein includes autonomous identification of interrelated metrics associated with a process that are witnessing anomalies or out-of-order behavior using artificial intelligence and machine learning technology based on analyzing large number of datasets each having TB s of data that are refreshed daily. Further, targeted actions are undertaken rapidly to address any root causes affecting performance of the process.

In accordance with one aspect of the present invention, is provided, a computer-implemented method for optimizing performance of a process. The method includes: constructing a KPI tree structure modelling workflow of the process and interrelationships among the participating KPIs using data received from a client device; autonomously monitoring anomalies among plurality of interconnected metrics by analysing data from the KPI tree structure; determining one or more root causes for an issue affecting the performance as identified by the autonomous monitoring of the plurality of interconnected metrics; recommending one or more actions correlating with one or more levels in the workflow to remediate the one or more root causes post evaluation of effectiveness of those actions using controlled experiments; enabling performance of the one or more actions in the process workflow by integrating the one or more actions with execution of process workflow; and tracking impact of the one or more actions using continually received feedback on implemented actions and analysis of data from the KPI tree structure.

In another aspect, a system for optimising performance of a process is provided. The system comprises a memory device and at least one processing device in communication with the memory device. The system includes instructions executable by the processing device to cause the system to perform operations comprising: constructing a KPI tree structure modelling workflow of the process and interrelationships among the participating KPIs using data received from a client device, autonomously monitoring anomalies among plurality of interconnected metrics by analysing data from the KPI structure, determining one or more root causes for an issue affecting the process performance, as identified by the autonomous monitoring of the plurality of interconnected metrics, recommending one or more actions correlating with one or more levels in the workflow to remediate the one or more root causes post evaluation of effectiveness of those actions using controlled experiment, enabling performance of the one or more actions in the process workflow by integrating the one or more actions with execution of process workflow; and tracking impact of the one or more actions using continually received feedback on implemented actions and analysis of data from the KPI tree structure.

DRAWINGS

The system and method are described in greater detail with reference to exemplary embodiments in accordance with the accompanying drawings.

FIG. 4 illustrates a flow chart concerning an embodiment of a method for optimizing performance of a process, in accordance with an embodiment of the present invention.

DETAILED DESCRIPTION

Figure 1:
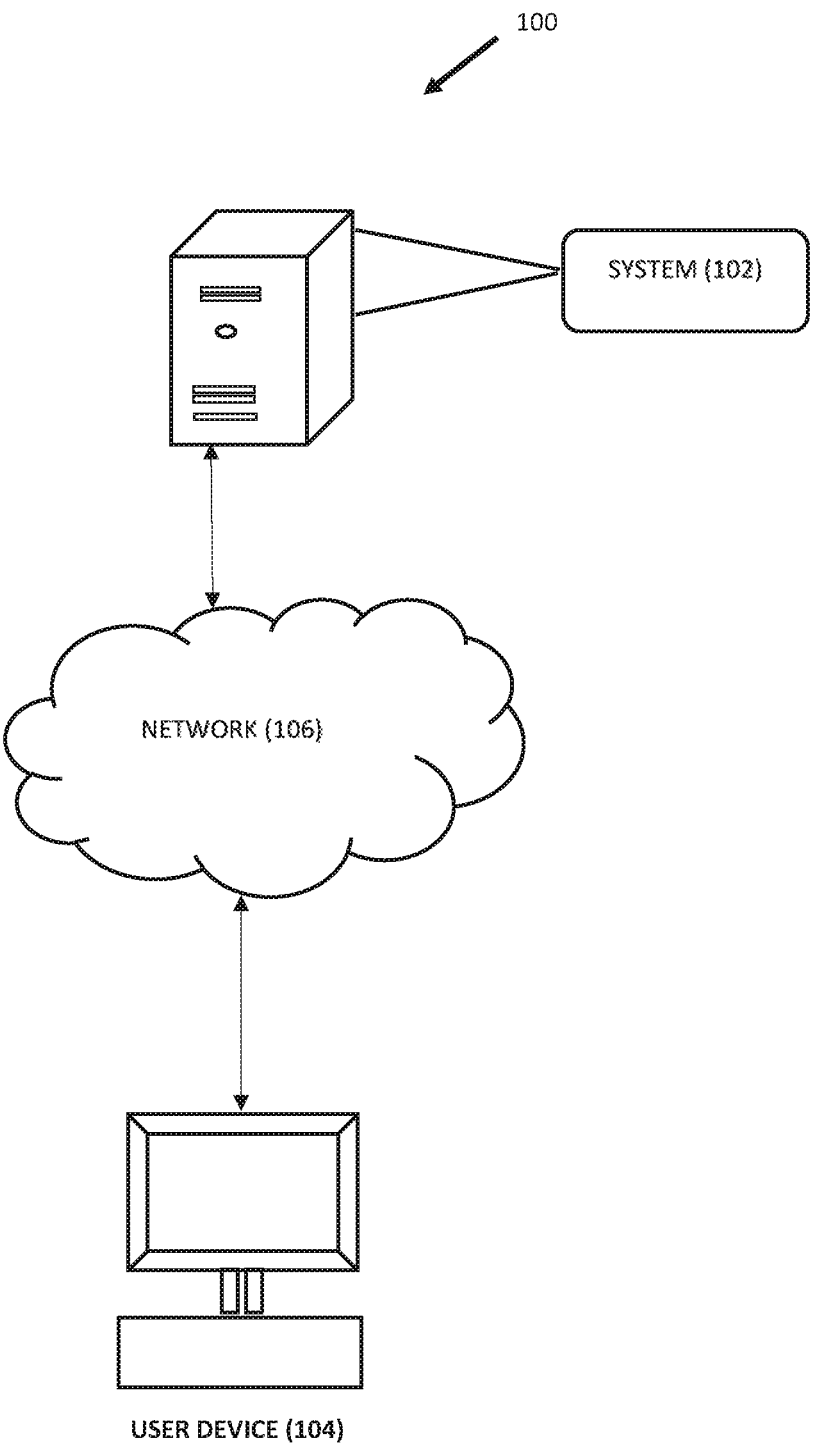
FIG. 1 illustrates an exemplary network environment in which a system for optimizing performance of a process may be implemented, in accordance with an embodiment of the present invention.

In the following description, reference is made to the accompanying drawings in which is shown by way of illustration specific examples that may be practiced. The disclosure may, however, be embodied in many different forms and should not be construed as limited to the embodiments set forth herein; rather, these embodiments describe exemplary implementations so that this disclosure is thorough, and fully conveys the scope of the subject matter to those skilled in the art. The terminology used in the detailed description of the particular embodiments illustrated in the accompanying drawings is not intended to be limiting.

The description may refer to "an", "one" or "some" embodiment(s) in several locations. This does not necessarily imply that each such reference is to the same embodiment(s), or that the feature only applies to a single embodiment.

The singular forms "a", "an" and "the" are intended to include the plural forms as well, unless stated otherwise expressly. It will be further understood that the terms "includes", "including", "comprises" and/or "comprising" specify the presence of stated features, steps, operations, elements, and/or components, but do not preclude the presence of one or more other features, steps, operations, elements, components, and/or groups thereof.

Unless otherwise defined, all terms (including technical and scientific terms) used herein have the same meaning as commonly understood by one of ordinary skill in the art to which this disclosure pertains.

The figures depict simplified structure(s) only showing some elements and functional entities, whose implementation may differ from what is shown. The connections shown are logical connections; the actual physical connections may be different. It is apparent to a person skilled in the art that an element may also comprise other functions and structures configured to communicate with each other to perform the function of said element. All logical units depicted in the figures include the software and/or hardware components required for the unit to function.

All the embodiments as herein described with respect to the present invention are applicable to the method and the corresponding system. The method encompassed by the present invention includes autonomous monitoring of various metrics associated with a process and detecting anomalous behavior exhibited by any metrics. A root cause analysis is then implemented to identify the behavioral drivers underlying the anomalous behavior. One or more targeted actions are then recommended to remediate the root cause. The recommended actions are evaluated using controlled experiments. This is done by monitoring the on-ground impact of the actions under experimentation as they are applied to a limited group of users, accounts, products, and the like. The recommended actions are integrated with operating workflows of the process.

Although the present disclosure is explained considering that the system 102 is implemented at a server, the system 102 may also be implemented in a variety of computing systems, such as a laptop computer, a desktop computer, a notebook, a workstation, a mainframe computer, a network server, a portable electronic device and the like. In one embodiment, the system 102 may be implemented in a cloud-based environment. The system 102 is accessed by multiple users through one or more client devices also referred to as user devices 104, or applications residing on the user devices 104. Examples of the user devices 104 include, but are not limited to, a portable computer, a personal digital assistant, a handheld device, and a workstation. The user devices 104 may be communicatively coupled to the system 102 through a network 106.

Different embodiments of the present invention may be utilized in a variety of network architectures. In one embodiment, the network 106 may be a wireless network, a wired network, or a combination thereof. The network 106 may be implemented as one of the different types of networks, such as intranet, local area network LAN, wide area network WAN, the internet, etc. The network 106 may either be a dedicated network or a shared network. The shared network may represent an association of the different types of networks that use a variety of protocols e.g., Hypertext Transfer Protocol HTTP, Transmission Control Protocol/Internet Protocol TCP/IP, Wireless Application Protocol WAP, etc. to communicate with one another. Further, the network 106 may include a variety of network devices, including routers, bridges, servers, computing devices, storage devices, etc.

Figure 2:
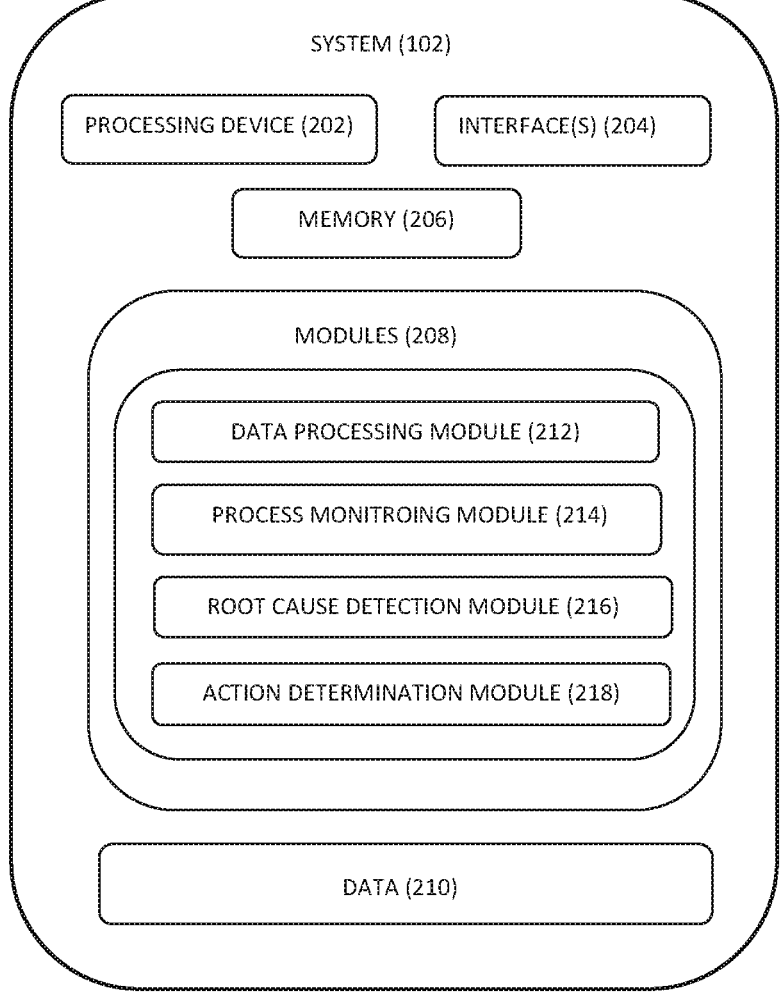
FIG. 2 illustrates an overview of a system for optimizing performance of a process, in accordance with an embodiment of the present invention.

FIG. 2 illustrates an exemplary system for optimizing performance of a process, in accordance with an embodiment of the present invention. The system 102 is configured to process raw data and generate insights on integrated KPIs in a rapid (such as in a matter of minutes) and repeated manner, enabling setting up process performance improvement actions. In one embodiment, the system 102 may include at least one processing device 202, an input/output (I/O) interface 204, a memory 206, modules 208 and data 210. The at least one processing device 202 may be implemented as one or more microprocessors, microcomputers, microcontrollers, digital signal processors, central processing units, state machines, logic circuitries, and/or any devices that manipulate signals based on operational instructions. Among other capabilities, the at least one processing device 202 may be configured to fetch and execute computer-readable instructions stored in the memory 206.

The I/O interface 204 may include a variety of software and hardware interfaces, for example, a web interface, a graphical user interface, etc. The I/O interface 204 may allow the system 102 to interact with a user through the user devices. Further, the I/O interface 204 may enable the system 102 to communicate with other computing devices, such as web servers and external data servers (not shown). The I/O interface 204 can facilitate multiple communications within a wide variety of networks and protocol types, including wired networks (e.g. LAN, cable networks, etc.) and wireless networks (e.g., WLAN, cellular networks, or satellite networks). The I/O interface 204 may include one or more ports for connecting a number of devices to one another or to another server.

The memory 206 may include a volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The modules 208 may include routines, physical components, data structures, etc., which perform particular tasks and functions. In one embodiment, the modules 208 may include a data processing module 212, a process monitoring module 214, a root cause detection module 216, an action determination module 218 and other modules (not shown). The other modules are configured to supplement applications and functions of the system 102.

The data 210, among other things, may serve as a repository for storing data processed, received, and generated by one or more of the modules 208. The data 210 may also include a system database, and other data generated from the operation of one or more modules in the other modules 218. The data 210 stores the raw data relating to a process received from the client device.

The data processing module 212 is configured to receive raw data (in big data scale) from a client device relating to a process. The process may relate to an organisation, an asset class, a unit, an individual user segment or any combination thereof to which levels in the process workflow correspond to. The data processing module 212 is configured to construct an interrelated KPI tree structure to model the workflow of the process using said data. The construction of interrelated KPI tree structure includes plotting inter-relations among the KPIs in the form of a tree or network. The values in the KPIs are auto-computed and auto-populated at every data refresh. The data processing module 212 is configured to organize the organisational metrics (KPIs) as a hierarchy from lagging to leading metrics.

The process monitoring module 214 is configured to autonomously monitor a plurality of interconnected metrics by analysing data from the KPI tree structure.

The root cause detection module 216 is configured to determine one or more root causes for an issue affecting the process performance based on the autonomous monitoring of the plurality of interconnected metrics. The determination of one or more root causes comprises analyzing data from the KPI tree structure and using AI and ML models to identify one or more metrics exhibiting anomalous behavior. Said models are used to identify behavioral drivers and provide insights on movements and shifts within the inter-related KPIs in near real-time or real-time.

The root cause determination module 216 enables identification of the right problem areas to be addressed in a targeted manner. In an embodiment, the root cause determination module 216 is configured to identify the 'nodes of concern' in the KPI tree structure autonomously leveraging anomaly detection on the data underlying the KPIs.

The action determination module 218 is configured to determine one or more actions to remediate the one or more root causes and drive performance of the process. The one or more actions are determined based on insights obtained during the determination of one or more root causes. The improvement actions may be integrated with individual levels in a process workflow such as account, end-user and product. The actions can take various forms and shapes depending on the industry area. For example, in case of Banking where Loan Collections Operations are being investigated and improved, the actions may be related to waive off, restructuring of schedules or simply, increasing the contact frequency and changing type of contact method (e.g., using outgoing calls instead of SMS to improve right party contact) etc.

The action determination module 218 is configured to generate a recommendation including the one or more determined actions. The recommendation includes the one or more actions correlated with one or more levels in the process workflow with which said actions can be integrated. The recommendation further includes the one or more actions correlated with one or more entities represented in the KPI tree structure on which the actions are to be performed to materially improve target KPIs. The recommendation may further include a duration for which the one or more actions are to be performed.

In a preferred embodiment, the action determination module 218 is further configured to perform controlled experimentation functionality whereby the number of actions generated by the module are subjected to a finite number of experiments of various type on a limited set of users, accounts, and products etc. The experimentation functionality determines the probability of success of said actions on the full audience/user set once implemented at the full scale. This functionality supports the system to finalize the one or many actions for full scale implementation and integration from among the several action candidates.

The process monitoring module 214 is configured to track performance of the process after integration of the one or more actions recommended by the action determination module 218 with the execution of the process workflow. The one or more actions may be undertaken by the action determination module 218 or notified to be undertaken by one or more other modules in the system.

Further, the process monitoring module 214 is configured to track impact of the performance of the process after implementing the one or more recommended actions. In one embodiment, the process monitoring module 214 is configured to track success of the one or more recommended actions based on continually received feedback and KPI data analysis. The value in the KPI tree structure is continually updated each time process data is refreshed.

The information on the process performance after implementing the one or more actions is utilized by the action determination module 218 to further determine one or more alternative and/or additional actions that can be used to optimize the process performance. In an embodiment, the action determination module 218 is configured to utilize feedback on implemented actions received from the process monitoring module 214 along with the analysis of data from the KPI tree structure to continually determine alternative actions. The action determination module 218 is configured to analyze the alternative actions in a controlled experimentation environment before recommendation for implementation.

Figure 3:
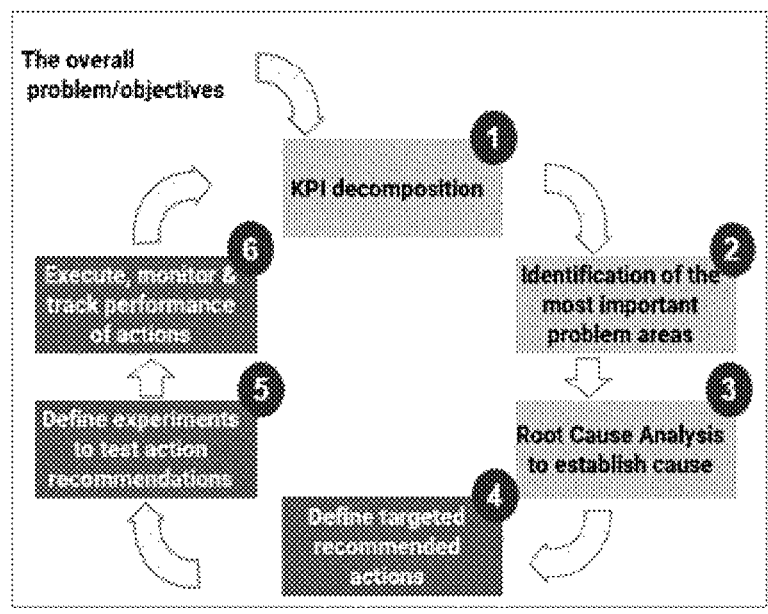
FIG. 3 illustrates an overview of a concept a method for optimizing performance of a process, in accordance with an embodiment of the present invention.

As shown in FIG. 3, a block diagram providing an overview of the method involved in the implementation of the present invention is illustrated. According to the present disclosure, the process optimisation is carried out in one or more stages. In the first stage, relevant KPI trees that help measure health/performance of a process are defined and configured to structure a process objective, for example, cross usage percent via digital channels. A shareable repository of KPIs available to users is then built, for example, recovery rate. Further, data connectivity is established to automate the KPI refresh process, for example, connecting raw data from the client device and model output database.

At the second stage, autonomous metric monitoring is performed to identify the most important problem areas in the process workflow. Specifically, the stage comprises using ML and AI models to monitor KPI movements and flag exceptions e.g., if a particular dip in a metric is anomalously low indicating onset of a potentially sustained trend or just a one-off event. Continuous monitoring of the interconnected metrics related to the process is carried out to indicate potential anomaly, generate insights on movements in KPIs and prioritize process tasks and activities.

In the third stage, intelligent root cause analysis is performed to establish cause of the anomalous behavior. Specifically, the stage may comprise a cohort analyser automating the identification of cohorts/micro-segments that drive KPI movements using ML techniques such as but not limited to Decision Trees. Further, clustering and segmentation may be performed to uncover additional insights that indicate natural groupings in population and interaction with cohorts.

In the fourth stage, action recommendations targeting behavioral drivers exhibiting anomalous behavior are determined. Specific actions targeting cohorts exhibiting anomalous behaviors can be determined. The determination of said specific remedial actions may be automatic based on analysis of historical actions or manual or a combination thereof. The action determination is done so that the performance of the cohort/process can be improved by implementing the recommended actions for example, targeted contact strategy. The recommendation of target actions includes the duration for performing each action, for example, offset on a task due date. The action recommendation of target actions may also define an expected outcome of performing the actions on the focus KPI from the KPI tree.

The fifth stage relates to defining experiments for each recommended action. The target user population for running the experiments is then finalized at the cohort segment level or filter node in the KPI tree structure based on statistically minimum population needed to ensure a particular significance level. Further, metrics and targets for determining success of an action are identified, for example, KPI change thresholds. This stage enables the system to determine and identify one of several action alternatives as the final action. In an alternative embodiment, an expert user may determine the actions to be pushed for full scale implementation for full benefit, without implementing the experimentation stage.

In the sixth stage, the actions are integrated with the execution platform or workflow system and KPIs are monitored. Further, changes in KPI at a node are detected and analysed to drill-down individual cohorts responsible for change. In an embodiment, a historical analysis of performance of experiment actions is made.

FIG. 4 illustrates a flowchart 400 of a method for optimizing performance of a process, in accordance with an embodiment of the present invention. The method of FIG. 4 may be implemented by the system of FIG. 2. At step 402, a KPI tree structure is constructed to model the workflow of process using data received from a client device.

At step 404, the interconnected metrics (KPIs) are autonomously monitored by continuously analyzing data from the KPI tree structure. Autonomous monitoring may reveal any anomalous behavior in one or more metrics in very recent past that is indicative of potential anomaly.

At step 406, intelligent root cause analysis is performed to identify the underlying behavioral factors by specific micro-cohorts. This enables identification of one or more root causes for an issue affecting the performance of the process. Determining the one or more root causes comprises analyzing data from the KPI tree structure and using AI models to identify one or more metrics exhibiting anomalous behavior. Automated identification of the root causes assists in determining as to why the performance dip or uptick identified in any step of a process are occurring. This is done by utilizing various AI and ML models and techniques such as segmentation, clustering and random forests to identify behavioral drivers and cohorts e.g., specific groups of accounts, users or transactions that are responsible for the movement of the said KPI.

Identification of the root causes enable action recommendations that are tailored to specific cohorts as opposed to generic actions. At step 408, one or more actions correlating with one or more levels in the workflow to remediate the one or more root causes are determined and notified. The determination of one or more actions is based on insights obtained during the determination of the one or more root causes. The recommendation of one or more actions may include correlation of said actions with one or more levels in the process workflow or with one or more entities in the KPI structure or a combination thereof. The recommendation of one or more action may further include a duration for performing the action. This step 408 may further include performing controlled experimentation whereby statistical evaluation of various action alternatives is carried out by subjecting them to a limited population of users, accounts and products and measuring the impact on the KPIs. This evaluation then supports the system in finalizing the decision on which action(s) to finalize to be pushed to actual on ground implementation.

Subsequently at step 410, the one or more recommended actions are performed by integrating said actions at one or more levels in the process workflow.

At step 412, the impact of the one or more actions on ground is tracked by evaluating performance of KPI tree structure with one or more actions and utilizing said evaluation to obtain alternative actions for future so as to iteratively improve the decision outcomes. The effectiveness of the improvement actions is tracked at the cohort level by subjecting said cohort/process segment to implement said actions at full scale of the cohort/process segment.

The one or more steps in method 400 are repeated until a desired optimized state of process is achieved. Specifically, steps 402-412 are performed in iterative manner to continually track and improve the improvement of the process performance on ground due to implemented actions by processing feedback data from the client's systems using KPI tree construct.

Figure 5:
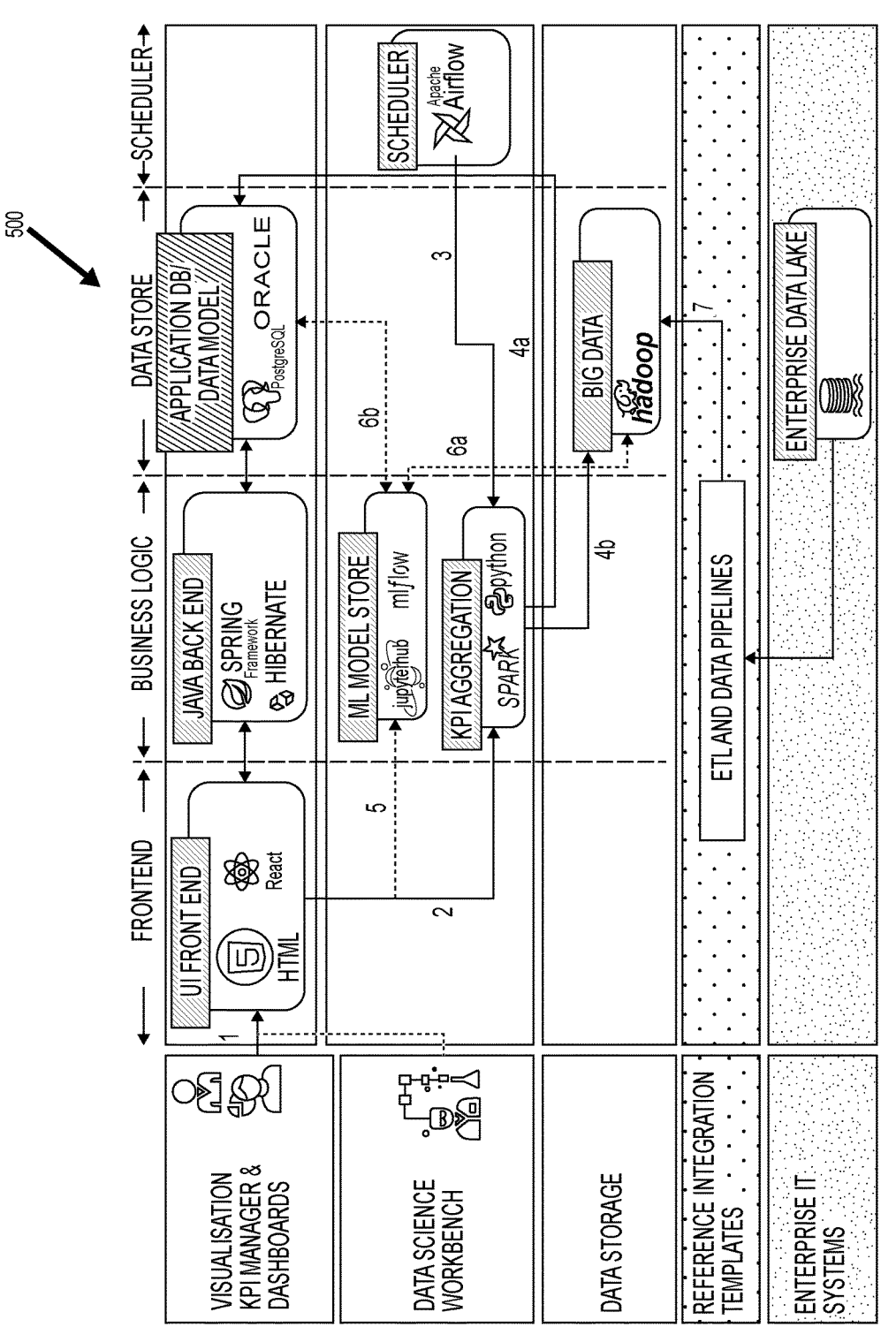
FIG. 5 illustrates an exemplary architecture of a platform where a method for optimizing performance of a process is executed, in accordance with an embodiment of the present invention

FIG. 5 illustrates an exemplary modular architecture of a platform where the optimization of process may be executed. The modules may be combined in any order to address specific use-cases and enable easier integration with any given technology stack. The platform encompassed by the present invention is a low code environment and works on a scalable data model that can roll up, drill down and dice data across multiple dimensions and create complex custom analysis in a rapid manner. The platform may be augmented with existing on-premises as well as cloud data environment. As shown in FIG. 5, path 1 illustrates creation of KPIs based on raw dataset received from a user device. A KPI Manager may be deployed to create KPIs for a process. Path 2 relates to creation of logic underlying the generation of the KPIs. Path 3 shows scheduling KPI generation Job. At paths 4a and 4b, the KPI result sets (generated at step 3) are stored. Path 5 depicts creating AI and Machine Learning (ML) models, cohort analyzer for anomaly detection and controlled experimentation operations. Path 6 indicates storing the data output during the processing by the AI and ML models. Path 7 shows the Extract, Transform and Load (ETL) and Data pipelines used in the platform to convert raw data into model-ready data quickly. Depending on the data size and other considerations, there could be ELT (Extract, Load and Transform) instead of ETL. The platform encompassed by the present invention has pre-built integration points with downstream applications to automate the action recommendation triggers and integrate with Systems of Record (inbound) and Systems of Engagement (outbound).

The system and method encompassed by the present invention provides the ability to track performance of a process through a set of interrelated KPIs in a top-down manner encoded as a KPI tree, while providing insights on significant trend shifts, anomalies and other underlying patterns in the data. The present disclosure provides an ability to do an assisted deep-dive on selected KPIs to understand the reasons behind the trend shifts and the anomalies e.g. root cause analysis, clustering, segmentation etc. The present disclosure also provides the ability to suggest improvement actions and recommendations based on the insights from deep-dive analysis and controlled experimentation. The present invention further provides the ability to measure the impact of modelling and analytics interventions on the KPIs in an action-oriented manner.

The present invention encompasses using a set of interconnected mechanisms that are run in a coordinated manner using data and model pipelines. The mechanisms include Machine Learning driven segmentation, predictive analytics, pattern intelligence, ranking and scoring, and recommendation modelling as well as accelerators to solve specific problems with respect to data—data quality (profiling, rules & remediation); data preparation for modelling (feature engineering—extract, generate, store & serve) and data summarization (metric query & aggregation).

Although the present invention has been described in considerable detail with reference to certain preferred embodiments and examples thereof, other embodiments and equivalents are possible. Even though numerous characteristics and advantages of the present invention have been set forth in the foregoing description, together with functional and procedural details, the disclosure is illustrative only, and modifications may be made, especially in terms of the structuring and implementation within the principles of the invention to the full extent indicated by the broad general meaning of the terms. The separation of various system modules and components in the embodiments described above should not be understood as requiring such separation in all embodiments, and it should be understood that the described components and systems can generally be integrated together in a single product or packaged into multiple products.

What is claimed is:

1. A computer-implemented method for optimizing performance of a process, comprising:
   a) constructing a KPI tree structure modelling workflow of the process using data received from a client device;
   b) autonomously monitoring a plurality of interconnected metrics by analysing data from the KPI tree structure;
   c) determining one or more root causes for an issue affecting the performance based on the autonomous monitoring of the plurality of interconnected metrics, wherein determining the one or more root causes further comprises using artificial intelligence models to identify behavioural drivers providing insights on movement and shifts in interrelated KPIs in near-real time;
   d) recommending one or more actions correlating with one or more levels in the workflow to remediate the one or more root causes;
   e) enabling performance of the one or more actions in the process workflow by integrating the one or more actions with execution of process workflow into a downstream application; and
   f) tracking impact of the one or more actions in the downstream application using continually received feedback on implemented actions and analysis of data from the KPI tree structure.

2. The computer-implemented method of claim 1, wherein determining the one or more root causes comprises analysing data from the KPI tree structure and using AI models to identify one or more metrics exhibiting anomalous behavior.

3. The computer-implemented method of claim 1, wherein recommending one or more actions is based on insights obtained during the determination of the one or more root causes.

4. The computer-implemented method of claim 1, wherein recommending the one or more actions further comprises evaluating performance of KPI tree structure with one or more actions in controlled experiments, and determining alternative actions in addition to the recommended one or more actions based on said evaluation.

5. The computer-implemented method of claim 1, wherein values in the KPI tree structure is refreshed each time data is refreshed.

6. The computer-implemented method of claim 1, wherein the one or more actions identify the entity in the KPI structure on which the one or more actions are to be performed, a duration for performing the action, an expected outcome.

7. The computer-implemented method of claim 1, wherein the one or more levels in the workflow relate, but not limited, to an organization, an asset class, a unit, an individual user segment, or any combination thereof.

8. The computer-implemented method of claim 1, wherein the steps b) to f) are repeated until an optimized state of process is achieved.

9. A system, comprising:
   a memory device; and
   at least one processing device in communication with the memory device and configured to execute instructions to cause the system to perform operations comprising:
   a) constructing a KPI tree structure modelling workflow of the process using data received from a client device;
   b) autonomously monitoring a plurality of interconnected metrics by analysing data from the KPI structure;
   c) determining one or more root causes for an issue affecting process performance based on the autonomous monitoring of the plurality of interconnected metrics, wherein determining the one or more root causes further comprises using artificial intelligence models to identify behavioural drivers providing insights on movement and shifts detected by AI models in interrelated KPIs in near-real time;

d) recommending one or more actions correlating with one or more levels in the workflow to remediate the one or more root causes;

e) enabling performance of the one or more actions in the process workflow by integrating the one or more actions with execution of process workflow into a downstream application; and f) tracking impact of the one or more actions in the downstream application using continually received feedback on implemented actions and analysis of data from the KPI tree structure.

10. The system of claim 9, wherein the determining the one or more root causes comprises analysing data from the KPI tree structure and using AI models to identify one or more metrics exhibiting anomalous behavior.

11. The system of claim 9, wherein recommending one or more actions is based on insights from analysis of the determined one or more root causes.

12. The system of claim 9, the recommending the one or more actions further comprises evaluating performance of KPI tree structure with one or more actions in controlled experiments, and determining alternative actions in addition to the one or more actions based on said evaluation.

13. The system of claim 9, wherein the values in the KPI tree structure is refreshed each time data is refreshed.

14. The system of claim 9, wherein one or more actions identify the entity in the KPI structure on which the one or more actions are to be performed, a duration for performing the action and an expected outcome.

15. The system of claim 9, wherein the one or more levels in the workflow relate, but not limited, to an organization, an asset class, a unit, an individual user segment, or any combination thereof.

16. The system of claim 9, wherein the at least one processing device causes the system to repeat operations b) to f) until an optimized state of process is achieved.

17. One or more non-transitory computer-readable media storing computer-executable instructions that upon execution cause at least one processing device to perform operations comprising:

a) constructing a KPI tree structure modelling workflow of the process using data received from a client device;

b) autonomously monitoring a plurality of interconnected metrics by analysing data from the KPI tree structure;

c) determining one or more root causes for an issue affecting the performance based on the autonomous monitoring of the plurality of interconnected metrics, wherein determining the one or more root causes further comprises using artificial intelligence models to identify behavioural drivers providing insights on movement and shifts detected by AI models in interrelated KPIs in near-real time;

d) recommending one or more actions correlating with one or more levels in the workflow to remediate the one or more root causes;

e) enabling performance of the one or more actions in the process workflow by integrating the one or more actions with execution of process workflow into a downstream application; and f) tracking impact of the one or more actions in the downstream application using continually received feedback on implemented actions and analysis of data from the KPI tree structure.

* * * * *